Figure 1:
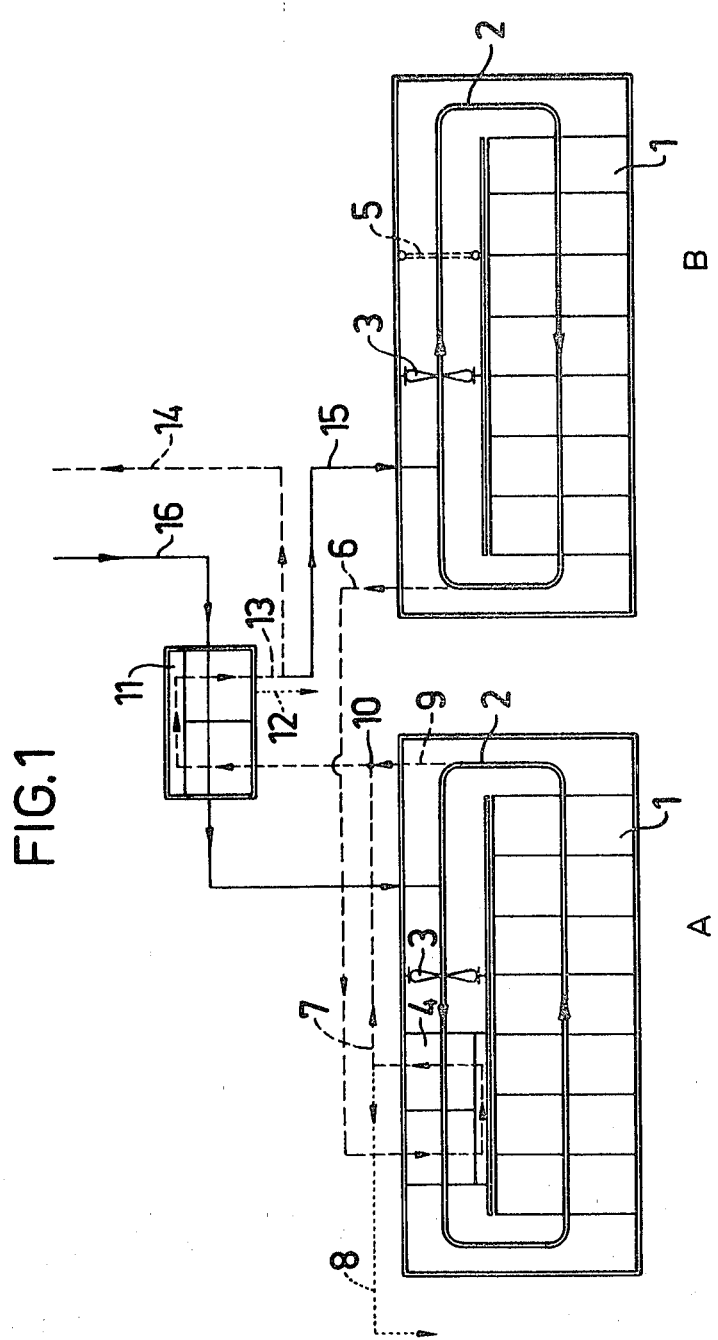

United States Patent [19]

Malmquist

[11] 4,255,870

[45] Mar. 17, 1981

[54] METHOD OF HOT-AIR DRYING

[75] Inventor: Lars Malmquist, Huddinge, Sweden

[73] Assignee: Svenska Traforskningsinstitutet, Stockholm, Sweden

[21] Appl. No.: 83,655

[22] Filed: Oct. 11, 1979

[30] Foreign Application Priority Data

Oct. 13, 1978 [SE] Sweden ............................... 7810712

[51] Int. Cl.³ .............................................. F26B 3/04
[52] U.S. Cl. .......................................... 34/35; 34/86; 34/212
[58] Field of Search ..................... 34/86, 35, 212, 213, 34/215, 216, 217; 432/72

[56] References Cited

U.S. PATENT DOCUMENTS

| 2,711,591 | 6/1955 | Wellmar | 34/86 |
| 3,437,321 | 4/1969 | Wilkinson | 34/86 |
| 3,849,904 | 11/1974 | Villalobos | 34/216 |
| 4,132,011 | 1/1979 | Nichols | 34/86 |

FOREIGN PATENT DOCUMENTS 132565 7/1951 Sweden .

*Primary Examiner*—Larry I. Schwartz
*Attorney, Agent, or Firm*—Cushman, Darby & Cushman

[57] ABSTRACT

The invention relates to a method of drying with hot air where the drying is divided into at least two partial processes, in parallel or in series with each other, and the circulation flows of the two partial processes are conditioned to substantially different wet temperature levels, and the spent air in the partial process with higher wet temperature is heat exchanged with the circulation air in the partial process with lower wet temperature, in combination with that the spent air flows from the two partial processes thereafter are mixed with each other and caused to pass a heat exchanger common for the processes in order to preheat the supply air to the partial process with low wet temperature and after the passage through the heat exchanger to partially constitute supply air for the partial process with high wet temperature.

1 Claim, 4 Drawing Figures

METHOD OF HOT-AIR DRYING

This invention relates to a method of drying material to be dried by circumcirculating about it an air stream, the condition of which is caused to assume a dry and wet temperature adapted for the quality of the material to be dried by supplying heat to the circulating air stream and removing moisture from the same by ventilation.

It is known that the heat consumption at drying can be reduced by carrying out the ventilation in such a manner, that the outgoing spent air (with higher temperature) delivers part of its enthalpy to the ingoing supply air (with lower temperature) in a heat exchanger. Such a heat recovery to the drying process theoretically can be driven to such an extent, that the spent air is cooled to the supply air temperature at the lowest and thereby a certain maximum part of the spent air enthalphy is returned to the drying process.

In conventional drying processes this principle is applied up to an economic limit for the size of the heat exchanger, because the energy amount required for the drying is great and often corresponds to about half the total drying cost. In the future a relative increase in the energy cost can be expected and, therefore, the request for drying processes with low energy consumption will increase very much.

The solution of the problem to be solved by the present invention utilizes the known method at drying with hot air, according to which the drying process is divided into two partial processes, either in parallel or in series with one another, and the circulation flows of the two partial processes are conditioned to substantially different wet temperature levels. The invention according to the characterizing clause of the claim is characterized in that the spent air in the partial process with higher wet temperature is heat exchanged with the circulation air in the partial process with lower wet temperature, in combination with that the spent air flows from the two partial processes thereafter are mixed one with the other and caused to pass through a heat exchanger common for the processes to preheat the supply air to the partial process with low wet temperature and after their passage therethrough to partially constitute supply air for the partial process with high wet temperature.

By such a method a substantially lower energy consumption is obtained than by the conventional heat exchange only between spent air and supply air to the process. The method is particularly suitable for use in such cases when the material to be dried is of such a nature, that additional technological advantages are obtained by dividing the drying into two different wet temperature levels. Examples of such material are wood of pine or spruce. The boards sawn from the sapwood of the logs must be dried at low wet temperature in order to prevent drying damages with respect to pitch flow and knot damages, while the centre wood must be dried at a higher wet temperature in order to prevent crack formation in these wood dimensions which usually are large. The boards, therefore, advantageously can be heated in a partial process with low wet temperature, in parallel operation with a partial process with high wet temperature for the centre wood, and heat exchange between the processes etc. according to the invention. The heat consumption for drying the boards, which contain much water (sapwood), can in this way be covered entirely by heat exchange with the spent air from the drying process for centre wood. The heat consumption for the total process can hereby be reduced to almost half of that in a conventional drying process.

Another interesting application of the invention consists of a progressive wood drying channel with circulation in longitudinal direction, which channel is divided into two drying zones connected in series and defined by a hoistable door, of which zones the first one is controlled on a low wet temperature level and the second one is controlled on a high wet temperature level, and the heat consumption for the first partial process is covered by spent air enthalpy from the second partial process. Such an arrangement offers, in addition to a heat consumption reduced by about half, further essential advantages, which will be explained below.

The detrimental effect of high wet temperature on the wood quality, for example export wood, by damages in the form of pitch flow and knot drop-out is concentrated to the first section of the drying process while the moisture ratio in the external parts of the wood still is higher than the fibre saturation moisture ratio. A low wet temperature at this stage of the drying, thus, is advantageous from a quality aspect. In the later stage of the drying when higher drying stresses in the wood easily give rise to crack formation, a high wet temperature is desirable, because the wood then becomes more plastic and the drying stresses thereby are balanced. An arrangement according to the invention connected in series, thus, can be expected, in addition to the reduced heat consumption, to result in reduced drying damages of conventional type.

Since more recently also another complication has been observed occurring at the drying of export wood, viz. that so-called thermotolerant mould fungus grows on the wood and forms amply spores during the drying operation. This complication is of a serious nature, because it implies a reduction in the wood quality with resulting economic consequences and because at continued handling of the wood in the sorting installation the mould spores on the wood get loose and fly about in the air, which gives rise to allergic troubles of the sorting workers, the so-called sorting plant disease. At the beginning the mould grows in the form of mycelium fibres invisible to the naked eye, which fibres after 35 to 40 hours form spores and cause a grey-black discolouration of the wood. At the application of the present invention here related to the duration of stay of the wood in the first zone with low wet temperature, for example 30° C., is only 20 to 25 hours, and spores therefore will not have enough time to develop. When the wood thereafter is fed into the second zone with high wet temperature, for example 60° C., which implies that the dry temperature of the air there varies between 65° and 75° C., the living conditions for the fungi do not exist any longer and fungus mycelium possibly formed will dy. It was found that a few hours are sufficient for killing the fungus at this temperature. In this way also the cross logs, with which the wood stacks are built up for drying, are sterilized automatically. These cross logs are at present a very important source of infection. Sterilization by fungicides is not desirable from an environment protection point of view.

Utilization of the invention in a drying plant with two processes with different wet temperature levels connected in series provided, in addition to substantially reduced heat consumption, an increasingly essential advantage with respect to drying of export wood in a progressive drier with longitudinal circulation, which is the economically most favourable drier type for such drying. Export wood is dried from newly sawn dryness to so-called shipping dryness, which implies a moisture ratio of about 18 to 20 percent. In recent times wood with a lower moisture ratio, primarily about 12 percent, has been demanded to an increasing extent and can be expected to be demanded still more. In a drier with circulation in the longitudinal direction the condition of the drying air depends to a high degree on the evaporation from the wood in the drying channel. The relatively low wet temperature (at maximum about 40° C., constant along the channel) which must be kept in view of pitch flow and knot damages, implies that the drying in the final phase proceeds slowly and with little evaporation. When trying in such a drier to dry to a moisture ratio below shipping dryness, the evaporation is so low that the circulation air will be too dry at the charging end of the drier and consequently cracks will be formed. When the evaporation in the second partial process is accelerated by a high temperature level, the wood can be dried at an advantageous drying scheme even to the lower moisture ratio 12 percent.

Figure 2:
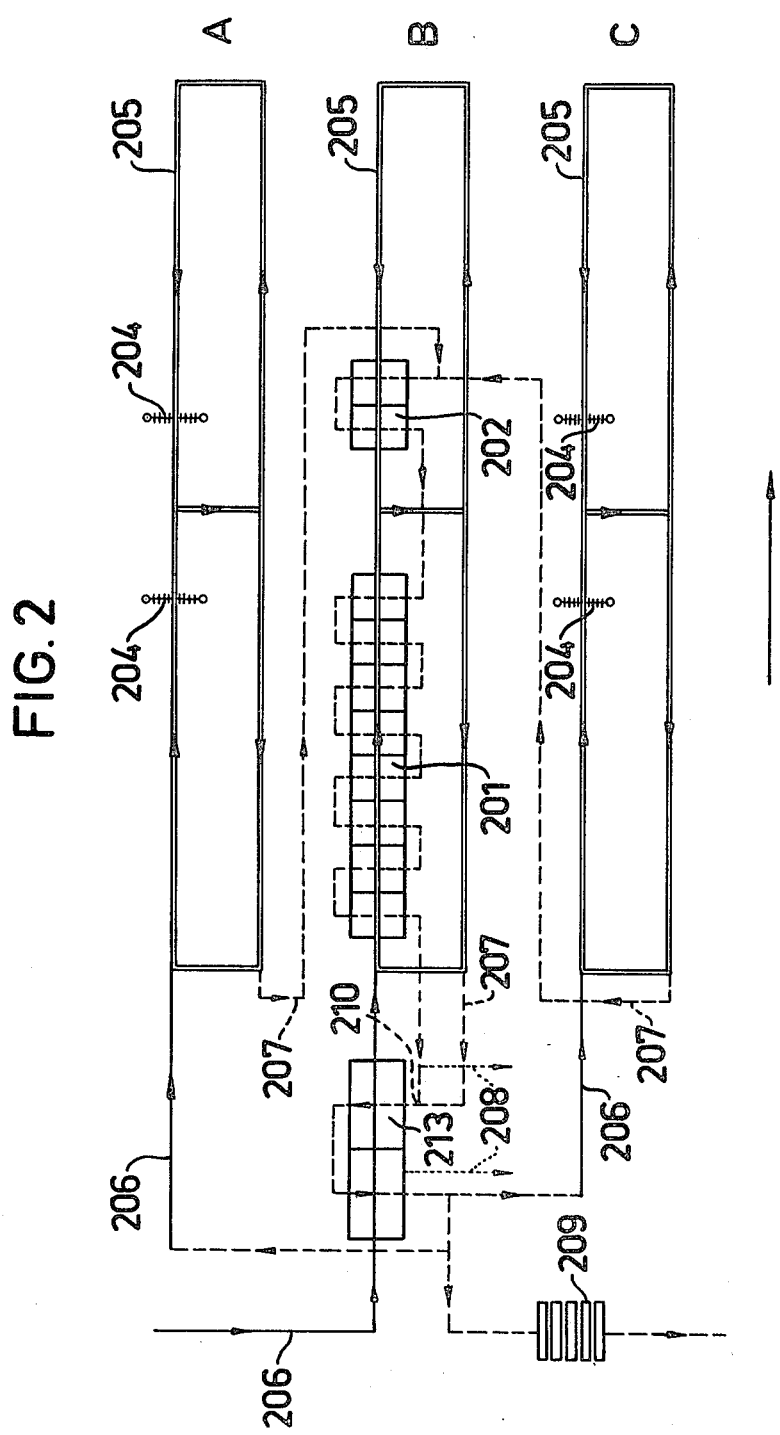
Figure 3:
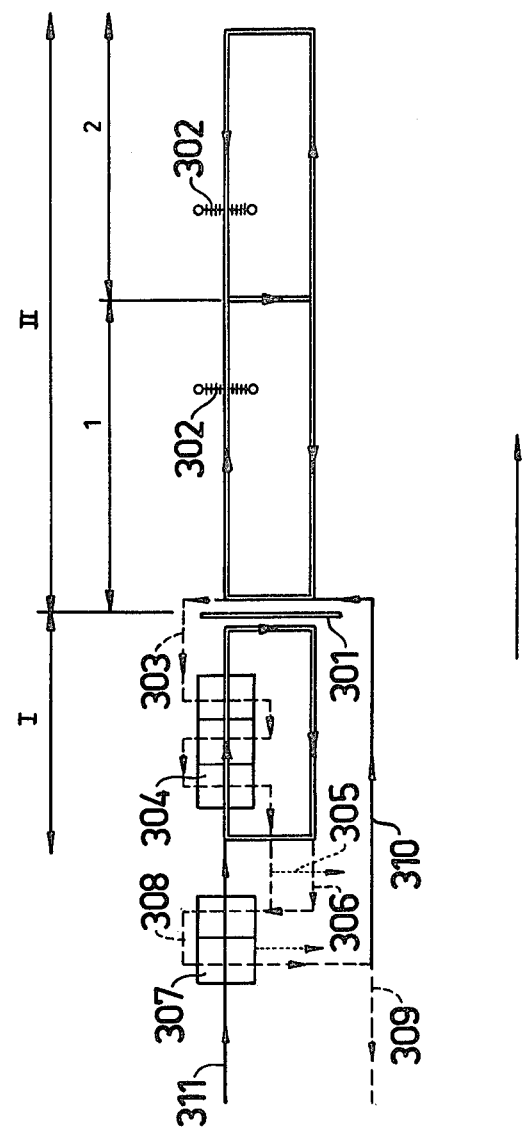
Figure 4:
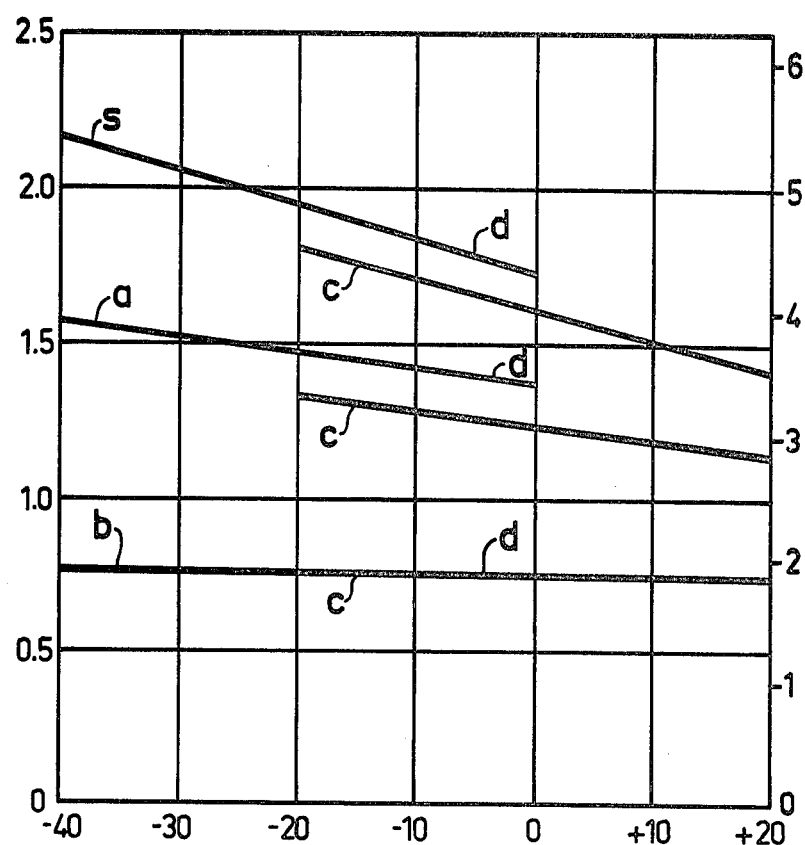

The purport of the invention is discussed further with reference to the description of the attached drawings, in which FIG. 1 shows the general principle for the method according to the invention, FIGS. 2 and 3 show the arrangement in principle for applying the invention to the drying of wood in two variants, and FIG. 4 shows the heat consumption at the utilization of the method according to the invention compared with conventional methods.

In FIG. 1 schematic arrangements for the partial processes A with low wet temperature and B with high wet temperature are shown. The material to be dried 1 in the partial processes is circumcirculated by the circulation air flows 2, which are brought about by fans 3. The circulation air in the partial process A is heated in the heat exchanger 4 while the circulation air in the partial process B is heated in conventional manner by heating batteries 5. The spent air 6 from the partial process B is passed to the heat exchanger 4 and after its passage therethrough divided into a saturated air flow 7 and a condensate flow 8. The spent air 9 from the partial process A is mixed with the saturated air flow 7 at 10, and the mixture is passed through an outer heat exchanger 11, whereafter the condensate 12 is separated and the saturated air flow 13 is divided into a partial flow 14, which is ejected from the installation, and a partial flow 15, which is used as supply air for the partial process B with high wet temperature. The supply air 16 to the partial process A with low wet temperature is preheated in the heat exchanger 11. The heat consumption for the partial process A is covered entirely by the enthalpy in the spent air 6 from the partial process B, and no separate external supply air to the partial process B is required. The combination of these two arrangements yield an extremely low heat consumption for the process as a whole.

FIG. 2 shows the principle of an application of the invention in three parallel channels for longitudinal circulation for export wood, so-called two-step channels (SE-PS 368 740). In the channels A and C centre wood is dried at high wet temperature (about 60° C.), and in the central channel B side boards are dried at low wet temperature (about 30° C.). The yield of side boards obtained at the sawing amounts to about one third, so the aforesaid division is expedient. The circulation air 205 in the central channel B is heated in the heat exchangers 201 and 202 in the two drying steps. The plant further is provided with a third heat exchanger 203. Heating batteries 204 emit heat in conventional manner to the circulation air 205 in the channels A and C. The supply air 206 to the channel B is preheated in the heat exchanger 203. The spent air 207 from the channels A and C is passed to the heat exchangers 203 and 11 in series, whereafter subsequent to condensate separation 208 it is mixed with the spent air 207 from the central channel B in the point 210. The mixture thereafter passes through the heat exchanger 203, and partial flows 206 are taken out as supply air to the channels A and C, and at the same time a partial flow is ejected out from the drying plant after it has preheated the wood 209 entering the channels, whereby the heat consumption is reduced still more. The arrow lowermost in the Figure indicates the transport direction of the wood through the channels. This arrangement has been calculated and dimensioned for a drying capacity of 100 000 m$^3$/year, and it yields a specific heat consumption of about 1900 KJ/kg evaporated water, substantially independently of the outside air temperature.

FIG. 3 shows the principle of an application of the invention in a channel with longitudinal circulation with drying zones connected in series for the drying of export wood (SE-PS 319 431). The drying channel is divided by a hoistable door 301 into two adjacent zones I and II, of which zone I is controlled on a low wet temperature, for example 30° C., and zone II is controlled on a high wet temperature, for example 60° C. Zone II is designed as a two-step channel (SE-PS 368 740) where the circulation air flows through the wood countercurrent to the transport direction of the wood in the first step and concurrent in the second step. The transport direction of the wood is indicated by an arrow lowermost in the Figure. The circulation air in zone II is heated in conventional manner in the heating battery 302. The spent air 303 from zone II, step 1, passes through a heat exchanger 304 located in the circulation flow in zone I where it emits heat to the circulation flow in zone I. After condensate separation 305 the spent air 303 from zone II is mixed with the spent air 306 from zone I and passes through the heat exchanger 307. After condensate separation a portion 309 of the spent air mixture 308 is ejected into the atmosphere, and a portion is used as supply air 310 to zone II. The supply air 311 to zone I is preheated by the spent air mixture 308 in the heat exchanger 307.

FIG. 4 shows a comparison of the specific heat consumption (heat consumption per kg evaporated water) expressed partly in relation to the steam formation heat of the water and partly in MJ/kg, for a conventional chamber drier S for wood, for a conventional drier a with longitudinal circulation and heat recovery, and for a drier according to the invention b designed as shown in FIG. 2. The heat consumption refers to the drying of newly sawn pine wood of 50 mm thickness to shipping dryness. Drying of unfrozen wood is designated by c, and drying of frozen wood is designated by d. The method according to the invention, in addition to the advantage of the drastically reduced heat consumption compared with conventional methods, also has the advantage that the heat consumption substantially is independent of the outside air temperature, so that the associated boiler installation can be reduced also for this reason.

What I claim is:

1. A method of drying with hot air wherein drying takes place in two interconnected partial processes which are conditioned to substantially different wet temperature levels and each of which includes an air supply, circulation air and spent air, said method comprising: passing the spent air from the higher wet temperature partial process in heat exchange relationship with the circulation air of the lower wet temperature partial process; mixing the spent air from the two partial processes; passing the resulting mixed air in heat exchange relationship with the air supply to the lower wet temperature partial process to preheat said air supply; and passing part of the mixed air after said heat exchange to the higher wet temperature partial process as the air supply thereto.

* * * * *